United States Patent [19]
Garriss et al.

[11] 4,128,123
[45] Dec. 5, 1978

[54] PASSIVE HEAT-TRANSPORT SYSTEM

[76] Inventors: John E. Garriss, 1325 E. Northern Pkwy., Baltimore, Md. 21239; Daniel E. Garriss, 1905 Brookside Dr., Edgewood, Md. 21040

[21] Appl. No.: 866,861

[22] Filed: Jan. 4, 1978

[51] Int. Cl.² .............................................. F28D 15/00
[52] U.S. Cl. ......................................... 165/1; 126/271; 165/40; 165/105
[58] Field of Search ...................... 165/1, 40, 32, 105; 126/271; 62/333

[56] References Cited
U.S. PATENT DOCUMENTS

| | | | |
|---|---|---|---|
| 2,068,549 | 1/1937 | Knight | 165/105 X |
| 2,230,917 | 2/1941 | Triana | 126/271 X |
| 2,242,926 | 5/1941 | Shipman | 62/333 X |
| 2,382,123 | 8/1945 | Anderson, Jr. | 62/333 X |
| 3,298,431 | 1/1967 | Weaver | 165/105 |
| 3,390,672 | 7/1968 | Snelling | 126/271 |

*Primary Examiner*—Albert W. Davis, Jr.
*Attorney, Agent, or Firm*—John F. McClellan, Sr.

[57] ABSTRACT

A passive system for volatile-fluid transport of heat energy from a source at a relatively higher temperature to a remote sink at a relatively lower temperature and for return of condensate from sink to source, operated by heat energy transported and temperature difference between source and sink.

11 Claims, 1 Drawing Figure

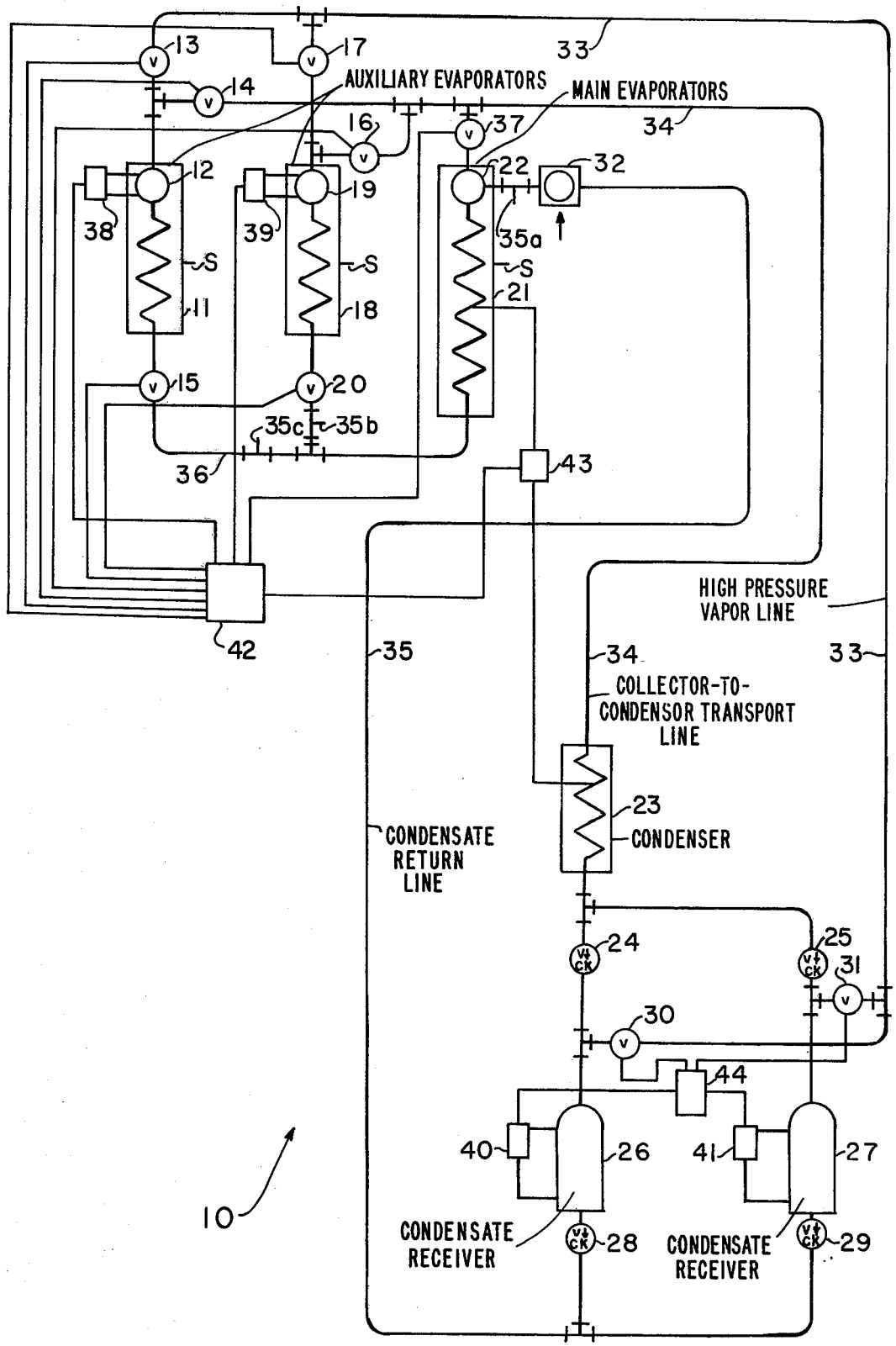

PASSIVE HEAT-TRANSPORT SYSTEM

This invention relates generally to fluid systems and specifically to fluid systems for energy-transport.

BACKGROUND OF THE INVENTION

In the prior art systems for the purpose heat transport have been disclosed, including those in the following U.S. Pat. Nos.:

2,068,549 to D. B. Knight, 1-19-37, disclosing intermittent return of liquid condensate using a combination of vapor pressure and gravity flow;

2,230,917 to P. G. Triana, 2-4-41, disclosing lifting liquids by solar heat using pressure of gas vaporized and reabsorbed;

3,298,431 to E. A. Weaver, 1-17-67, disclosing return to condensate by gravity flow; and 3,390,672 to C. D. Snelling, 7-2-68, disclosing returning condenste by pump or gravity-flow in a solar heating device.

In addition, textbooks deal with well known aspects of the art.

The present method in general use for transporting heat from an available source to a point of use, as in solar heating systems, is to circulate a sensible heat carrying medium such as air, water, a chemical compound, or the like, which is heated at the source, pumped to the point of use where the heat is extracted, and returned to the source to repeat the process. The most significant drawback to this method is the consumption of energy from an external utility source to pump the circulating fluid. There is a need for a method to transport heat energy using the same energy that is available at the source to power the system. The sensible heat carrying type media have the disadvantage of small heat carrying capacity per pound of fluid circulated. There is a need for a latent heat carrying type medium which will transport forty to fifty times more heat per pound in circulation, allowing systems to be made more compact and lighter in weight. Water is a widely used medium for the transport of heat, but when subjected to low temperatures must be mixed with antifreeze to prevent freezing. The anti-freeze must be periodically replaced, and is troublesome and costly. There is a need for a medium which will not be affected at below-zero conditions. Media which are circulated in vented and open systems are subject to the entrance of dirt and other contaminants including atmospheric gases which promote oxidation of the internal parts of the system. There is a need for a completely sealed system. In general, there is a need for a more efficient method to transport heat energy from the available source locations where it is seated to those locations where the heat energy can be put to use, conserving energy and at the same time eliminating many of the disadvantages in present practices.

SUMMARY OF THE INVENTION

The present invention is a multi-purpose, passive refrigerant cycle for transporting heat energy from a source location where it is available to a destination heat sink where it can be used or stored for future use. The heat energy intended for transport and the difference in temperature between the source and sink, power the system cycle. The operating principle of the cycle is based upon the interactions of heat energy with the refrigerant heat vehicle. A two-phase refrigerant mass is thermodynamically interposed in the system between the heat source location and the heat sink location with the liquid phase positioned to receive heat from the source. The vapor phase of the refrigerant mass contiguous with the liquid phase is made to extend in a continuous body of vapor from the surface of the liquid in the heat source location to the heat sink location where it is positioned to transfer heat to a cooler medium. The properties of the refrigerant at saturation are identical throughout the mass, the specific values being dependent upon the saturation temperature of the liquid phase and the type of refrigerant. The positioning of the refrigerant mass in simultaneous heat transfer contact with both the source and the sink establishes the conditions desired to obtain a dynamic state of concurrent evaporation and condensation in different areas of the same refrigerant mass at an equilibrium saturation pressure and temperature relative to the temperature of the liquid phase. Under the steady state operating conditions of the heat transport function of the cycle the gross total heat content of the refrigerant mass remains essentially constant at an equilibrium value while latent heat is simultaneously added to, and subtracted from the gross total. The balances between the distribution of energy and matter in the refrigerant mass are maintained by migrational movement of vapor bearing latent heat from the point of evaporation at the source to the point of condensation at the sink.

From the description of the heat transport function it will be apparent that the movement of the refrigerant mass in the vapor phase, and the subsequent change of state to the liquid phase at the heat sink location make it necessary to provide a second function for the continuous return of the condensed liquid phase refrigerant from the heat sink location to the heat source location to close the cycle of operation. The method and power for this function are also obtained from the interaction of the system refrigerant with the heat energy available from the source. According to this invention, a relatively small portion of the refrigerant mass in the liquid phase and vapor phase is confined and isolated from the transport area of the cycle, and is positioned to receive heat from the source to increase its saturation temperature and pressure to a value higher than the pressure existing in the transport areas of the cycle. The high pressure thus generated is hydraulically applied to move refrigerant liquid from the sink location to the source location against the opposing resistance of flow friction, counter-pressure, and gravity head.

Individual applications of this invention for use in transporting heat energy from a heat source location to a heat sink location will require obvious variations in the design of components, and in the method of automatic control due to inherent characteristics of the system. These variations are dictated by the magnitude of temperature difference available between the heat source and the heat sink in combination with the relative elevation of the heat source evaporators to the elevation of the heat sink condenser. The available temperature difference places a limit on the maximum allowable difference in height between the heat source evaporators and the heat sink condenser when the condenser is at a lower elevation than that of the evaporators. The magnitude of required temperature difference diminishes to zero as the elevation of the heat sink condenser changes from an elevation below that of the source evaporators to elevations above the source evaporators until the static head exerted by the height of the return liquid column is sufficient to return the liquid refrigerant by gravity alone. These parameters are well within the knowledge of anyone skilled in the art, as are the adjustments required to suit particular installations.

THE DRAWING

The FIGURE is a schematic drawing illustrating the arrangement and interconnection of the elements of the system.

DETAILED DESCRIPTION OF THE INVENTION

A volatile fluid, among many conventional and readily available volatile fluids suitable for use with this invention, is dichlorodifluoromethane, designated by a standard as ASHRAE refrigerant R-12.

The heat transport system generally identified in the Figure by reference numeral 10, is Powered by heat entering from a higher temperature common source S into the liquid refrigerant charge contained in main evaporator 21, increasing its saturation temperature and pressure. The increased vapor pressure is transmitted through open valve 37 and connecting piping 34 into condenser 23, where the vapor is condensed by the transfer of latent heat to any suitable cooler medium. The resulting condensate flows out of condenser 23 through check valve 24 into receiver 26, where it is accumulated until receiver 26 is filled. Auxiliary evaporator 11, containing an isolated charge of liquid refrigerant, with control valves 14 and 15 closed, is heated by the source to develop a high saturation pressure vapor. This high pressure vapor is transmitted through open valve 13 and connecting piping 33 to closed vavles 30 and 31. When receiver 26 has filled with liquid refrigerant condensate from condenser 23, valve 30 is opened to admit the high pressure vapor from auxiliary evaporator 11. The higher pressure vapor, and liquid pressure, thus resulting in receiver 26 closes check valves 24 and 29, and forces the isolated liquid refrigerant to feed through check valve 28 and connecting piping 35 to the inlet of liquid level control 32. The flow of liquid refrigerant condensate from condenser 23 is diverted through check valve 25 into receiver 27, where it is accumulated while receiver 26 is pressurized. The dual functions of receivers 26 and 27 are interchanged for liquid return as required, by alternating the positions of control valves 30 and 31. Liquid level control 32 feeds liquid and controls the operating liquid levels of refrigerant in main evaporator 21 and liquid refrigerant reservoir 22, and auxiliary evaporator 18 and liquid refrigerant reservoir 19 through equalizing connection 36 and open control valve 20. Advantageously, the liquid refrigerant charge in auxiliary evaporator 18 is heated by the common source with control valves 16 open and 17 closed to evaporate refrigerant liquid in parallel with main evaporator 21. When the isolated liquid refrigerant charge in auxiliary evaporator 11 falls below the optimum operating level range, the functions of auxiliary evaporators 11 and 18 are interchanged by closing control valves 13, 16, and 20, and opening control valves 14, 15 and 17, thus isolating auxiliary evaporator 18 with liquid reservoir 19 for high pressure vapor generation with a full level of refrigerant liquid. In this changeover auxiliary evaporator 11 advantageously goes into parallel operation with main evaporator 21, equalizing with it in pressure and liquid level.

As to size of each auxiliary evaporator heat exchange surface relative to that of the main evaporator, in a preferred embodiment applied in a solar heating system the ratio was approximately 0.07 auxiliary to 1.0 main. Because, in accordance with this invention as noted, at all times one of the auxiliary evaporators is continuously in parallel operation with the main evaporator, this ratio means that in a system with total capacity of 100,000 BTU per hour with an actual collection rate of 100 BTU/hour/sq. ft. of main evaporator, and having two auxiliary evaporators, each auxiliary evaporator would have 70 square feet of area and the main evaporator 930 square feet.

Continuous, automatic control of the passive heat transport cycle system may be obtained by the application of automatic control means which will accomplish and co-ordinate the following control functions:

1. To position all control valves automatically in the correct combinations and sequences by means of power actuated valves remotely controlled by liquid level and temperature differential sensing and controlling devices.
2. To position and re-position the power actuated control valves, automatically in the correct combinations and sequences to cause the required interchanges of the functions of the auxiliary evaporators, with the interchange initiated by float switches each time the liquid level in the auxiliary evaporator which is functioning in the hydraulic pressure generating mode is depleted to a predetermined level.
3. To position and re-position the power actuated valves automatically in the correct combinations and sequences to cause interchange of the functions of the condensate receivers, with the interchange initiated by float switches when the receiver accepting condensate from the condenser becomes filled.
4. To meter liquid phase refrigerant automatically into the heat source evaporators from the pressurized receivers to maintain the liquid level in the evaporators as refrigerant liquid is evaporated.
5. To over-ride other controls and position the power actuated valves controlling the heat source evaporators to the closed position automatically when the magnitude of the forward temperature difference between the heat source evaporators and the heat sink condenser falls below a pre-determined number of degrees difference, thereby placing the system into a stand-by status until the forward temperature difference rises above the pre-determined value.

One embodiment of the design of the invention incorporating automatic control for continuous operation of the system cycle consists of power actuated, remotely controlled valves 13, 14, 15, 16, 17, 20, 30, 31 and 37; liquid level control 32; refrigerant liquid level float switches 38, 39, 40 and 41; valve position control center 42; differential temperature control 43; and step controller 44 positioned as indicated in the schematic diagram and performing the control functions as stated above in paragraph 1 through 5. In operation, differential control 43 acts as the master control holding the system in a standby status as long as the temperature of main evaporator 21 is less than a pre-determined number of degrees warmer than condeser 23 by acting through valve position control center 42 to hold control valves 13, 14, 15, 16, 17, 20 and 37 in the closed position. As heat is transferred from the source to main evaporator 21 its temperature rises until it has increased by the pre-determined number of degrees above the temperature of condenser 23, causing differential temperature controller 43 to release the over-ride of valve position control center 42, opening control valve 37 and allowing float switches 38 and 39 to assume control over valves 13, 14, 15, 16, 17 and 20. These six control valves are operated simultaneously in two sets of three valves each, with one set always in the opposite position of open or closed to the other set when the system is not in the stand-by status. When valves 13, 16, and 20 are open, valves 14, 15 and 17 are closed, resulting in the functioning of auxiliary evaporator 11 in the mode for generation of pressure for liquid refrigerant return, and in auxiliary evaporator 18 functioning in parallel operation with main evaporator 21. When valves 13, 16 and 20 are closed, valves 14, 15 and 17 are open, resulting in the functioning of auxiliary evaporator 11 in parallel operation with main evaporator 21, and auxiliary evaporator 18 functioning in the mode for the generation of pressure for liquid refrigerant return. The interchange of functions between auxiliary evaporator 11 and auxiliary evaporator 18 is initiated by either float switch 38 or 39 acting through valve position control center 42 to reposition the sets of control valves whenever the liquid level in the auxiliary evaporator which is functioning in the hydraulic pressure generation mode is depleted by a pre-determined amount.

Liquid level control 32 feeds liquid refrigerant from the pressurized receiver through connecting piping 35 into evaporator 21 as needed to maintain the liquid level in reservoir 22 at the operating level.

Control valves 30 and 31 are always operated in opposite positions of open and closed. When control valve 30 is open, control valve 31 is closed and receiver 26 is supplied with high pressure vapor for hydraulic return of the liquid contained by receiver 26 to main evaporator 21 through liquid level control valve 32, and receiver 27 is accepting liquid refrigerant condensate effluent from condenser 23. When control valve 31 is open, control valve 30 is closed, and receiver 27 is supplied with high pressure vapor for hydraulic return of the liquid contained by receiver 27 to main evaporator 21 through liquid level control 32, and receiver 26 is accepting the liquid refrigerant condensate effluent from condenser 23. The interchange of functions between receiver 26 and receiver 27 is initiated by either float switch 40 or 41 acting through step controller 44 to re-position the control valves whenever the liquid level in the receiver accepting condensate from condenser 23 reaches the full level.

Those skilled in the art will recognize that the liquid levels in liquid refrigerant reservoirs 12, 19 and 22 may be individually controlled and supplied with liquid refrigerant to allow their location at different relative elevations, that the single control valves could be replaced with three-way valves, and in some cases with check valves, and that the system is simple to automate with a wide variety of automatic control methods which are available and are easily applied by those skilled in the art, to this invention.

Reference numerals 35a, 35b, 35c indicate a provision possible, but not preferred for reasons set forth below, by which condensate may be returned directly to the auxiliary evaporators rather than through the main evaporator, from line 35.

It will be appreciated that the control circuits indicated may be implemented in any of several conventional ways well-known to those skilled in the art and within the routine capability of control instrumentation workers, following the principles set out in this disclosure and using commercially available components throughout. For example, the various units may be obtained as follows as off-the-shelf items: the remotely controlled power operated valves, SPORLAN Company, 7525 Sussex Avenue, St. Louis, Mo. 63143; the refrigerant check-valves WATSCO Company, 1800 W. 4th Avenue, Hileah, Fla., 33010; the refrigerant float switches, Emerson Electric Co., P.O.B. 12700, St. Louis, Mo.; the refrigeration liquid level control, H. A. Phillips and Co., 3255 W. Carroll Avenue, Chicago, ILL., 60624 (The Series 301-$ being a good example); and the differential thermostat, The Honeywell Company, Minneapolis, Minn.

Advantages of replenishing condensate or volatile fluid by gravity through the main or first evaporator, defining the first location, to the auxiliary second and third evaporators, respectively defining the second and third locations at substantially the same level, include quicker and more uniform thermal reaction because by volume the first evaporator has seven times the ballast effect of the combined volumes of the substantially equal sized pair of auxiliary evaporators. Further, it will be appreciated that the principles can be extrapolated to any number of additional evaporators. Still further, this provision minimizes the number of elements required and raises efficiency of the system as a whole in conjunction with the preferred but not essential feature of incorporating two or more isolatable condensate-accumulating stations and constraining vapor from the auxiliary accumulators to pressurize and return the condensate selectively according to a predetermined standard.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In passive heat transfer system having means for taking in heat through a volatile fluid in evaporator means at a heat source and discharging heat from vapor of the volatile fluid through condensing means at a heat sink, and means for receiving condensate, each said means having an input and an output, the improvement comprising: said evaporator means including first, second and third evaporators with respective inputs and outputs, means for selectively transferring said vapor from the first and second or alternatively from the first and third evaporator outputs to the condensing means, and means for returning the condensate from said receiving means selectively to the first and second evaporators or alternatively to the first and third evaporators, including: means for pressurizing the receiving means from the output of the third evaporator when the first and second evaporators are transferring vapor to the condensing means, or alternatively for pressurizing the receiving means from the output of the second evaporator when the first and third evaporators are transferring vapor to the condensing means.

2. In a passive heat-transfer system as recited in claim 1, the receiving means comprising a first receiver and a second receiver; and means for selectively connecting either of said first and second receivers for said pressurization by the third evaporator and the other of said first and second receivers for receiving condensate from the condensing means or alternatively for connecting either of said first and second receivers for said pressurization by the second evaporator and the other of said first and second receivers for receiving condensate from the condensing means.

3. In a passive heat-transfer system as recited in claim 2, said means for returning including means selectively passing condensate through the first evaporator to the second evaporator or alternatively through the first evaporator to the third evaporator.

4. In a passive heat-transfer system as recited in claim 3, means for controlling level of condensate returned to the first evaporator.

5. A process for passive transfer of heat in continual-cycle heat transfer from a heat source to a heat sink using volatile fluid, comprising the steps: (a) continuously evaporating vapor by heating volatile fluid at a first location with heat from said source; (b) condensing said vapor from the first location by thermal exchange of said heat sink; (c) replenishing volatile fluid evaporated at said first location by: (i) continuously evaporating vapor from respective quantities of said volatile fluid at a second location and at a third location, with heat from said source; (ii) alternately constraining vapor from said second location and from said third location to pressurize and return said condensate to the first location.

6. In a process as recited in claim 5, the additional steps of (d) replenishing volatile fluid evaporated at the second and third locations by cyclically: (i) condensing at said heat sink vapor from the third location and replenishing the quantity of volatile fluid at the third location from volatile fluid at the first location, concurrently with said pressurization and return of condensate to the first location by constrained vapor from the second location; and alternately (ii) condensing at said heat sink vapor from the second location and replenishing the quantity of volatile fluid at the second location from volatile fluid at the first location, concurrently with said pressurization and return of condensate to the first location by constrained vapor from the third location.

7. In a process as recited in claim 6, in step b, accumulating said condensate at a first station and a second station; and in step c(ii), selecting whether condensate from one of said first and second stations is to be returned prior to condensate from the other of said first and second stations on the basis of condensate accumulations to a predetermined amount.

8. A process for passive transfer of heat in continuous cycle from a heat source to a heat sink using volatile fluid, comprising the steps:
   (a) vaporizing at first, second and third locations volatile fluid;
   (b) chaneling vapor from said first and third locations to and condensing same at said heat sink; while
   (c) concurrently with step b, returning said condensate to the first and third locations by constraining said vapor from the second location to pressurize said condensate; and
   (d) cyclically alternating with the sequence of steps b and c, the following sequence:
   (e) channeling vapor from said first and second locations to and condensing same at said heat sink; while
   (f) concurrently with step e, returning said condensate to the first and second locations by constraining said vapor from the third location to pressurize said condensate.

9. In a process as recited in claim 8, passing all said return of condensate to the second and third locations through the first location.

10. In a process as recited in claim 9, the additional steps of controlling the level of volatile fluid in the first location, and causing all said return to the second and third locations to be under gravity.

11. In a process as recited in claim 9, causing all said vaporizing at the first location being in greater quantity than the vaporizing at the second and third locations combined.

* * * * *